(12) United States Patent
Fuchs et al.

(10) Patent No.: US 8,375,308 B2
(45) Date of Patent: Feb. 12, 2013

(54) MULTI-USER CONVERSATION TOPIC CHANGE

(75) Inventors: Omri Fuchs, Ramat Gan (IL); Michal Jacovi, Rakefet (IL); Elad Shahar, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 12/144,870

(22) Filed: Jun. 24, 2008

(65) Prior Publication Data

US 2009/0319917 A1    Dec. 24, 2009

(51) Int. Cl.
G06F 3/00    (2006.01)

(52) U.S. Cl. ........ 715/753; 715/751; 715/752; 715/755; 715/758

(58) Field of Classification Search .................. 715/751, 715/752, 753, 755, 758
See application file for complete search history.

(56) References Cited

U.S. PATENT DOCUMENTS

| | | | | |
|---|---|---|---|---|
| 5,918,236 A | * | 6/1999 | Wical | 715/209 |
| 6,178,430 B1 | * | 1/2001 | Cohen et al. | 715/273 |
| 6,509,912 B1 | * | 1/2003 | Moran et al. | 715/762 |
| 6,564,244 B1 | * | 5/2003 | Ito et al. | 709/204 |
| 6,630,944 B1 | * | 10/2003 | Kakuta et al. | 715/758 |
| 6,928,262 B1 | * | 8/2005 | Kanemitsu | 455/3.06 |
| 7,530,021 B2 | * | 5/2009 | Cheng et al. | 715/753 |
| 2003/0197730 A1 | * | 10/2003 | Kakuta et al. | 345/758 |
| 2004/0103148 A1 | * | 5/2004 | Aldrich | 709/204 |
| 2005/0265264 A1 | * | 12/2005 | Hering et al. | 370/260 |
| 2006/0056440 A1 | * | 3/2006 | Khartabil | 370/447 |
| 2006/0106872 A1 | * | 5/2006 | Leban et al. | 707/104.1 |
| 2006/0195785 A1 | * | 8/2006 | Portnoy et al. | 715/700 |
| 2008/0115058 A1 | * | 5/2008 | Shih | 715/700 |
| 2008/0195454 A1 | * | 8/2008 | Lee | 705/8 |
| 2008/0250331 A1 | * | 10/2008 | Tulshibagwale | 715/751 |
| 2009/0083694 A1 | * | 3/2009 | Argott | 717/101 |
| 2009/0307613 A1 | * | 12/2009 | Essenmacher et al. | 715/758 |
| 2009/0319917 A1 | * | 12/2009 | Fuchs et al. | 715/753 |
| 2010/0231790 A1 | * | 9/2010 | Ansari et al. | 348/552 |

* cited by examiner

Primary Examiner — Doon Chow
Assistant Examiner — David Choi
(74) Attorney, Agent, or Firm — Udi Einhorn; Ryan, Mason & Lewis, LLP

(57) ABSTRACT

Techniques for changing a conversation topic between one or more users via a user-interface are provided. A request to change the conversation topic is obtained from the one or more users via the user-interface. An indicator is presented to the one or more users notifying the one or more users, via the user-interface, of the request to change the conversation topic. The conversation topic between the one or more users is changed in response to an affirmative act by at least one of a moderator, the one or more users, and a predefined condition.

26 Claims, 4 Drawing Sheets

500

MULTI-USER CONVERSATION TOPIC CHANGE

FIELD OF THE INVENTION

The present invention generally relates to multi-user communications and, more particularly, to techniques for enabling a non-disruptive conversation topic change during multi-user communications.

BACKGROUND OF THE INVENTION

Today, technology allows multiple parties from all over the world to communicate with each other in organized communications forums. For instance, groups of individuals miles apart can easily discuss complex issues and exchange ideas via text sessions (e.g., chat rooms), voice sessions (e.g., teleconferences), or other forms of communication common in distributed organizations. Regardless of how convenient multi-party communications have become, there continues to be a fundamental challenge with group communications. During complex group interactions, raising new topics or influencing a topic change continues to be a major issue.

In general, communicating parties have difficulty raising new discussion topics. For example, during audio and video communications, it is considered impolite to interrupt a speaker in many cultures. Alternatively, raising new topics may be difficult because an overbearing speaker is adamant and aggressive about a topic being discussed. In many instances, no matter how important a topic is or the number of participants supporting a topic, an aggressive and confident participant has a better chance of influencing the direction of a discussion over a more passive participant.

Additional problems exist in text forums. Although text forums allow multiple users to write instant messages in parallel, which encourages users to raise new discussion topics, the general discussion becomes fragmented due to numerous threads occupying the same chat window. Such discussions are often difficult to follow. Further, although it is easier to introduce new topics in a text forum, only a limited number of topics can be discussed in detail because there is a lack of focus between the communicating parties when too many topics are introduced.

Many conventional technologies fail to facilitate organized group discussion. For example, some forums are accompanied by a support system, such as a meeting room, chat program, etc. These tools allow users to set static topics in advance (e.g., setting a chat room description). However, these tools do not help users raise new topics or influence a topic change during group interactions. Further, even if an agenda is set in advance, the direction of a group discussion remains unregulated. For example, too much focus may be spent on a specific topic, a discussion may diverge to an unimportant topic related to the current topic, and/or a discussion may diverge to a totally unrelated topic. Frequently, the direction of a group discussion largely depends on the associative thinking of the more aggressive parties in the group; those who are able to divert the discussion to their will. Therefore, the decisions on what items to discuss are not explicitly made, but are determined by the flow of thought of one or more influential participants. This form of biased agenda-setting may direct a communication towards unimportant topics and away from important topics.

SUMMARY OF THE INVENTION

Principles of the present invention provide techniques that overcome the above-mentioned drawbacks associated with existing methods by providing techniques that address the above needs, as well as other needs. Particularly, principles of the invention provide techniques for raising new discussion topics (i.e., conversation topics) during a multi-user communication.

For example, in one embodiment of the invention, a technique for changing a conversation topic between one or more users via a user-interface comprises a computer performing the following steps. A request to change the conversation topic is obtained from the one or more users via the user-interface. An indicator is presented to the one or more users notifying the one or more users, via the user-interface, of the request to change the conversation topic. The conversation topic between the one or more users is changed in response to an affirmative act by at least one of a moderator, the one or more users, and a predefined condition.

In additional embodiments, the above technique for changing a conversation topic between one or more users via a user-interface may be carried out by an apparatus and/or a computer program product.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described in conjunction with exemplary methods for changing a conversation topic between one or more communicating users via a user-interface. Specifically, the present disclosure will illustrate techniques to notify one or more users of a request to change a conversation topic. It should be understood, however, that the invention is not limited to the particular embodiments described herein. The principles of this invention are generally applicable to any form of communication between multiple users, which may include but is not limited to audio, video, and/or text based communications. Modifications to the illustrative embodiments will become apparent to those skilled in the art given the teachings described herein.

The term "conversation topic" as used herein is intended to be construed broadly so as to encompass, by way of example and without limitation, any subject of discussion.

During a multi-party communication, an individual party may believe that a current conversation topic has been exhausted or that there are more urgent topics to discuss. In order to invoke a topic change, the party must interrupt the current discussion, which requires some courage and initiative. In addition, the party must propose the topic change at the appropriate time or the party may be perceived by others as rude. In an ideal situation, individuals of a discussion group may encourage each other to suggest changes to a current topic whenever they feel it is appropriate; however, this may trigger multiple mini-discussions on selecting a new topic, which is more often than not distracting and time-consuming.

In order to facilitate topic changes or suggestions without interrupting the flow of an ongoing discussion, we propose a system that enables users, via a user-interface, to request a change in the topic of discussion (i.e., conversation topic) during a group communication.

Figure 1:
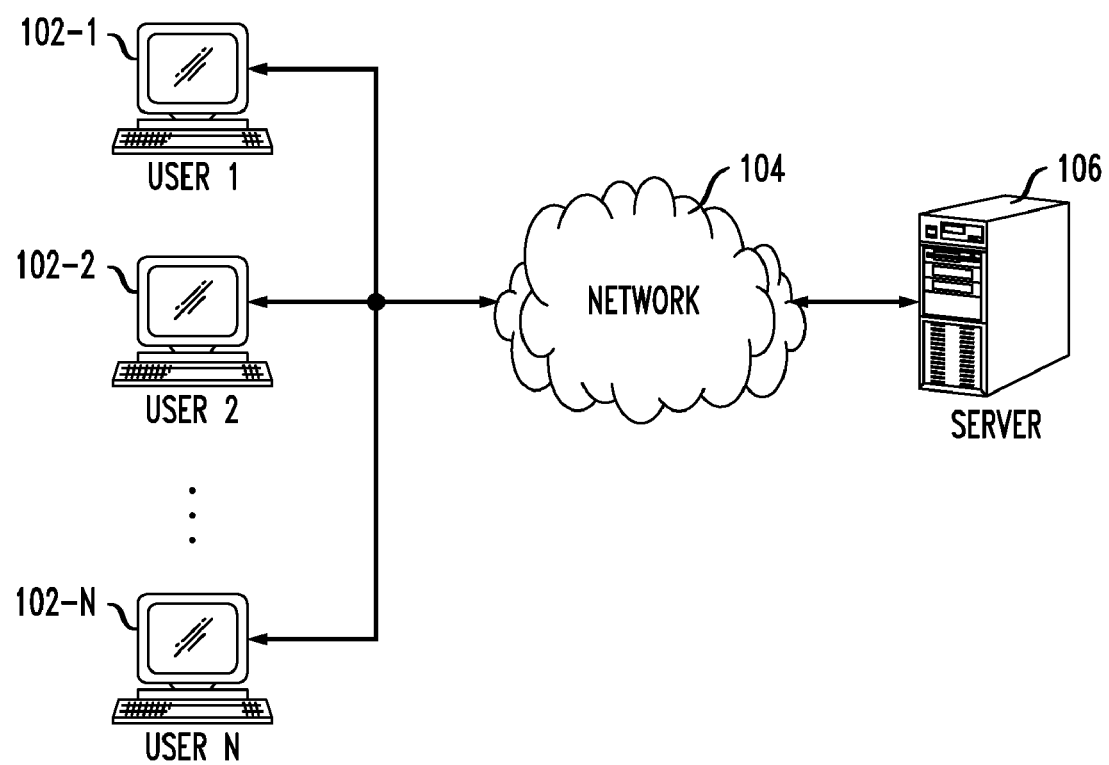
FIG. 1 is a diagram illustrating one general implementation for employing the proposed techniques, according to an embodiment of the present invention.

Referring initially to FIG. 1, a diagram illustrates one general implementation for employing the proposed techniques, according to an embodiment of the present invention. In an exemplary embodiment, one or more users (102-1, 102-2, . . . 102-N) are connected to a server 106 via a communications network 104. Each of the one or more users (102-1, 102-2, . . . 102-N) may communicate with one other via computer-based terminals. The computer-based terminals may comprise software which can interface with a communications platform (e.g., virtual room or chat room) maintained on the server 106. In one embodiment, the techniques for changing a conversation topic between one or more users via a user-interface may be carried out by a stand-alone, multi-user communications environment maintained on server 106. In an alternative embodiment, the one or more users (102-1, 102-2, . . . 102-N) may be communicating with each other in a virtual meeting room or a chat program maintained on server 106 and the techniques for changing a conversation topic between one or more users via a user-interface may be carried out by an add-in program, which may be integrated into the user-interface of the virtual meeting room or the chat program.

Figure 2:
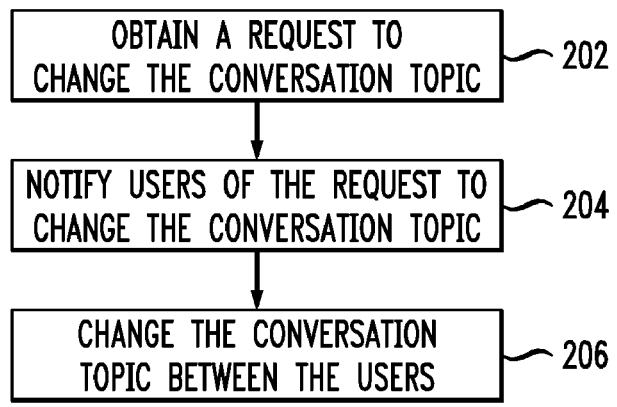
FIG. 2 is a flow diagram illustrating a methodology for changing a conversation topic between one or more users via a user-interface, according to an embodiment of the present invention.

Referring now to FIG. 2, a flow diagram illustrates a methodology 200 for changing a conversation topic between one or more users via a user-interface (e.g., a topic interface), according to an embodiment of the present invention. In an illustrative embodiment, methodology 200 is carried out by a topic interface program stored on the terminals of the one or more users or stored on the server 106. Methodology 200 begins at step 202 where a request to change a conversation topic (i.e. discussion topic) between one or more communicating users is obtained by the topic interface. The topic interface encourages communicating parties to disclose their thoughts about the appropriateness of the current discussion topic and suggest ideas for more important topics. At the same time, the topic interface minimizes interruptions and distractions to the current topic being discussed. Two exemplary modes of obtaining a request to change a current discussion topic are illustrated.

In a first mode, users are given the ability to subtly indicate a request to change the current discussion topic. Under the first mode, users may express disinterest in the current discussion topic, and at the same time, avoid declaration of a new topic of discussion. This may be ideal for users who simply want to request a change in the current discussion topic but have no recommendations for a new topic. The first mode is also recommended for those who do not wish to derail the flow of the current discussion by openly proposing new discussion topics. In an exemplary embodiment, the topic interface may obtain a subtle indication from a user to change the current discussion topic by providing a one-click button. In one example, a button labeled "I think it's time to change the subject!" is displayed on the topic interface. In an additional embodiment, if the one-click button is activated by a user, the topic interface may prompt the user for additional information about his/her request to change the topic. Furthermore, the one-click button may trigger the topic interface to switch modes (see below) depending on how many users request a topic change.

In a second mode, users are encouraged to be more upfront in their request to change the current discussion topic. Under the second mode, the topic interface obtains a request to change the conversation topic by prompting users to input one or more new discussion topics. Unlike the first mode, the second mode is better at invoking a change in topic because newly proposed discussion topics are directly presented to the other users (see step 204, described below). However, it should be noted that the second mode may be more distracting to users than the first mode. In an exemplary embodiment of the second mode, the topic interface may request a description of the newly proposed discussion topic, a priority of the proposed discussion topic (e.g., low, medium, or high importance; or a number from 1 to 10, 1 being low priority and 10 being high priority), and/or an estimated time to discuss the proposed discussion topic (e.g., ten minutes). It is to be appreciated that additional information may be requested by the topic interface regarding a newly proposed discussion topic.

Transitions between the two modes may be implemented in numerous ways. For example, the virtual meeting room or the chat program, in which the topic interface is incorporated, may select a mode in accordance with its operation. In the alternative, the topic interface may be automatically configured to use a particular mode. Further, one or more authorized users may switch between the two modes as desired. Or, a discussion moderator, selected by the users, may judge the overall demand for a topic change and then enable the mode that induces a topic change; the selected mode is then applied to all users participating in the discussion. In another embodiment, the topic interface may automatically change the mode for all users when certain conditions are met, for example, if more than 50% of the users are interested in a topic change, the topic interface may switch to the mode which prompts users for new topics (e.g., first mode to second mode). In an exemplary embodiment, the topic interface may initially operate in the first mode, where users simply indicate that it is time to change the topic (e.g., one-click button). When the number of users interested in a topic change reaches a predefined threshold (e.g., greater than 50%), the topic interface automatically switches to the second mode, prompting users to input new conversation topics. This enables a reasonable and gradual transition from a non-disruptive method of changing topics to a more upfront method of changing topics. It is to be appreciated that the present invention is not limited to only two modes and various customized modes may be utilized to facilitate topic changes.

After obtaining a request to change the current discussion topic, methodology 200 continues to step 204 where the users of a discussion group are notified of the request to change the discussion topic. In an exemplary embodiment, the notification step may depend on the mode in which the topic interface is operating. For example, in the first mode, there are several ways to indicate the subtle request (e.g., one-click button) to change a current discussion topic. One way may be to present a graphical indicator showing the percentage of communicating users interested in changing topics. The graphical indicator may be a bar graph or a numerical percentage, which may be displayed to all the communicating users via the topic interface. As more users click on the button to change the topic, the indicator may visually depict a general disinterest to the current discussion topic (e.g., there is an increase in the bar graph or the numerical percentage). This in turn may encourage one or more users to affirmatively change the discussion topic. Another notification option may be to list the users interested in raising a new topic together with a number of new topics each user would like to raise. This second option is less subtle, but may be preferable over the more anonymous indicator option.

In the second mode, the topic interface may present a dynamic list of topics proposed by the one or more users. The list of proposed discussion topics may be displayed to all the users via the topic interface. The list may comprise information obtained from the users during step 202 and information automatically recorded during a user request to change the discussion topic. For example, the list may comprise a title of a newly proposed topic, a short description of the newly proposed topic, an identification (e.g., username) of the user who proposed the new topic, an estimated time to discuss the newly proposed topic, and a priority of the newly proposed topic. In an additional embodiment, one or more users may examine the list and indicate support for a proposed topic via the topic interface. The number of users supporting a newly proposed topic may also be displayed on the list of topics. Furthermore, the number of users supporting a proposed topic may affect the estimated time to discuss the proposed topic. For example, if a large number of users indicate support for one particular topic, the topic interface may modify the estimated time to discuss that particular topic to reflect this support; the topic interface may increase the estimated discussion time of the proposed topic to indicate the support and assumed importance of the proposed topic. In the alternative, the topic interface may prompt a supporting user to input an estimated time for discussing the proposed topic. This estimated time is averaged with other inputted estimated times to discuss the proposed topic and the average time is displayed to all the users.

It should be noted that the list of topics may be presented as a prioritized list. In one embodiment, the topic interface determines the priority of a topic in accordance with a remaining discussion time ("Is there enough time left to discuss the new topic?"), the priority of the topic ("How important is this topic?"), the estimated time to discuss the topic ("This topic will take a long time to discuss"), and/or the number of users supporting the topic ("Many users support this topic making it a priority").

In one illustrative embodiment, the topic interface displays a time when the discussion session between the users started (e.g., a discussion start time), a predetermined time of when the discussion session would end (e.g., a discussion end time), a remaining discussion time (e.g., the difference between the discussion end time and the discussion start time), and a start and end time for a discussion topic. Concurrently, the prioritized list may organize a discussion topic according to its priority and if the discussion topic can be discussed within the remaining discussion time. Further, after a topic is discussed, the discussion topic may be deleted from the list. In the alternative, if a topic cannot be discussed due to time constraints, the topic may be pushed to the bottom of the list and marked in red, indicating to the users an inability to discuss that particular topic.

The listing of proposed discussion topics invites additional features. For example, the topic interface may be configured to allow users and/or discussion moderators to combine one or more topics on the topics list. This may be done to consolidate similar topics and avoid redundant discussions. The topic interface may also allow authorized parties to delete topics from the list. For instance, if a user realizes that his/her proposed discussion topic has been discussed, the user may want to remove it from the discussion list. In the alternative, an authorized party may delete topics which are inappropriate or unrelated to the topics at hand.

After notifying the users of a request to change the discussion topic (step 204), the topic interface changes the discussion topic in response to an affirmative act (e.g., selection of a new discussion topic) by a discussion moderator, one or more users, and/or a predefined condition (step 206). The discussion moderator may be an individual selected by a majority of the communicating users to moderate their group discussion. Further, a predefined condition may be a situation triggering a change in the discussion topic. For example, if more than 50% of the users request a change in the discussion topic, the topic interface may automatically change the discussion topic to the next item listed on the topics list. Also, if the estimated time to discuss a topic has expired, the topic interface may move on to the next topic listed. In another embodiment of the present invention, the topic interface may prompt a vote in response to an act to change topics. Before voting on the list of topics, the current discussion topic may be automatically added to the list of topics to be voted upon. This is to prevent an unwanted topic change.

As stated above, after a topic is discussed, the topic is removed from the topics list. Further, after the total discussion session time expires, the topic interface may summarize the topics discussed. For example, the topic interface may report the topics discussed and/or the topics not discussed. This allows the users to gauge the efficiency of their discussion session. Further, the report of topics not discussed gives users a discussion agenda for future use.

The proposed topic interface facilitates a change in the discussion topic between communicating parties. However, the agenda of a discussion session may be managed in three general ways. First, there may be a moderator who is responsible for managing the agenda. The moderator may assume several tasks. The moderator may decide when a topic change is in order, receive topic suggestions from group members and filter them, etc. The moderator may even decide which of the topics on the topics list will be discussed next.

In a second alternative, the agenda is managed by the group. For example, a topic change could be triggered once the number of participants who are disinterested in the current topic goes above a certain threshold (e.g., greater than 50%). The topic which will be chosen next may be determined either according to the existing priorities in the prioritized topics list or a special voting phase could be held to allow the group to choose.

Finally, the agenda may be unmanaged. According to this alternative, the topics list could be managed, but it has no binding force on the ongoing discussion. People can look at the list, support topics, etc. But there is no formal stage in which voting is triggered or when a topic is decided upon. Rather, the discussion takes its course, perhaps influenced by the input of group members. In this case, the topics list could simply serve as a check list of what topics users want to discuss.

These alternatives may be mixed in various ways. For example, the topic change process may be triggered when the number of disinterested participants reaches a threshold (e.g., group managed), but the final choice of topic may be made by the moderator (e.g., moderator managed).

Figure 3:
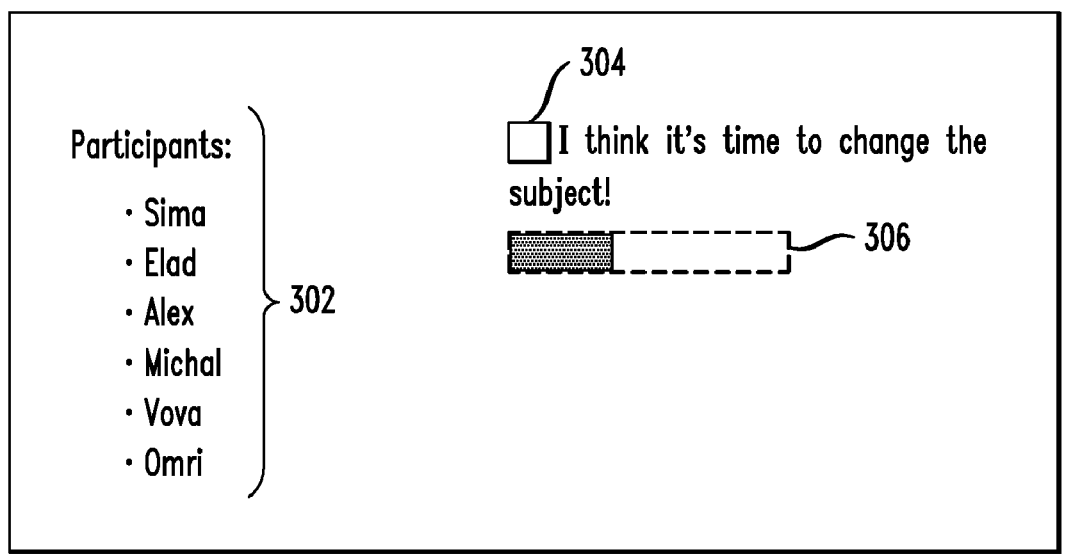
FIG. 3 is a screenshot illustrating an exemplary user-interface with a bar indicator notifying users to change the conversation topic, according to an embodiment of the present invention.

Referring now to FIG. 3, a screenshot illustrates an exemplary user-interface (e.g., topic interface) with a bar indicator notifying users to change the conversation topic, according to an embodiment of the present invention. FIG. 3 illustrates the first mode as discussed above with reference to FIG. 2, step 202. In an exemplary embodiment, the topic interface comprises a participant list 302 listing the users participating in a group discussion. The interface further comprises a one-click button 304 labeled, "I think it's time to change the subject!" and a bar indicator 306 depicting the general interest in changing the current discussion topic. In this embodiment, a user interested in changing discussion topics would click on button 304. As more users click on button 304 displayed on their respective interfaces, the bar indicator 306 increases from left to right.

Figure 4:
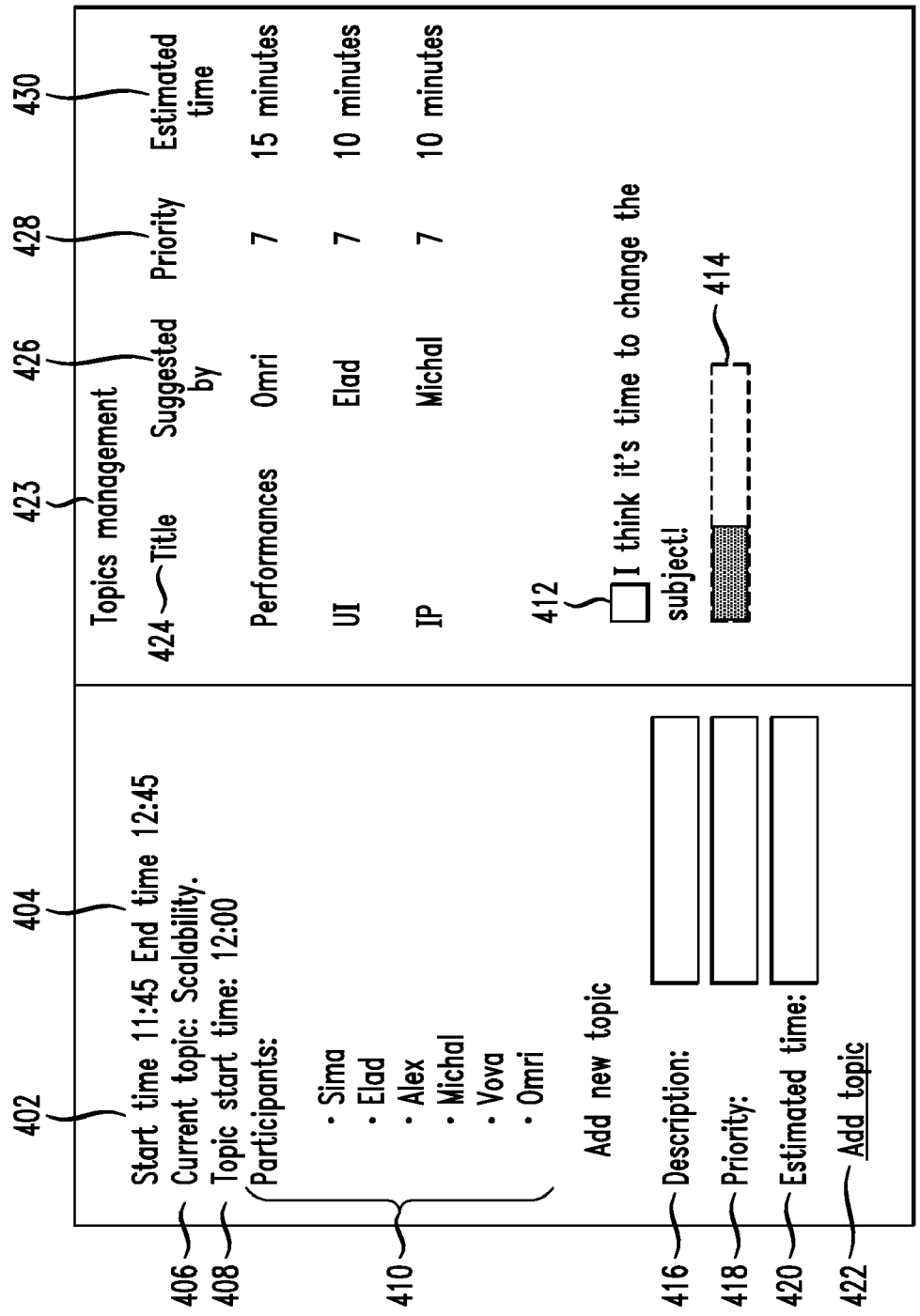
FIG. 4 is a screenshot illustrating an exemplary user-interface which incorporates the ability to add new conversation topics, according to an embodiment of the present invention.

Referring now to FIG. 4, a screenshot illustrates an exemplary user-interface which incorporates the ability to add new conversation topics, according to an embodiment of the present invention. In this exemplary embodiment, the topic interface comprises a discussion start time 402 and a discussion end time 404. The start time 402 and end time 404 may be designated by one or more users and/or by the discussion moderator prior to the discussion session. The interface further displays the current topic 406 being discussed by the communicating users and the discussion start time of that topic 408. As in FIG. 3, a participant list 410 listing the users participating in the group discussion is displayed. Further, a one-click button 412 labeled, "I think it's time to change the subject!" and a bar indicator 414 depicting the general interest in changing the current discussion topic is also displayed.

The interface of FIG. 4 incorporates user prompts to propose (i.e., add) a new topic. FIG. 4 illustrates the second mode as described with reference to FIG. 2, step 202. The interface prompts a user to input a topic description 416, a topic priority 418, and an estimated time to discuss the proposed topic 420. After a user inputs this information, the user may submit his/her proposed topic via a submit button 422. The proposed topic and accompanying information is then inserted into a prioritized list 423, as described above with reference to FIG. 2, step 204. The prioritized list 423 displays a title of the proposed topic 424, a name of the user proposing the topic 426, a priority of the proposed topic 428, and an estimated discussion time of the proposed topic 430. As the proposed topics are discussed, they may be removed from the prioritized list 423.

Figure 5:
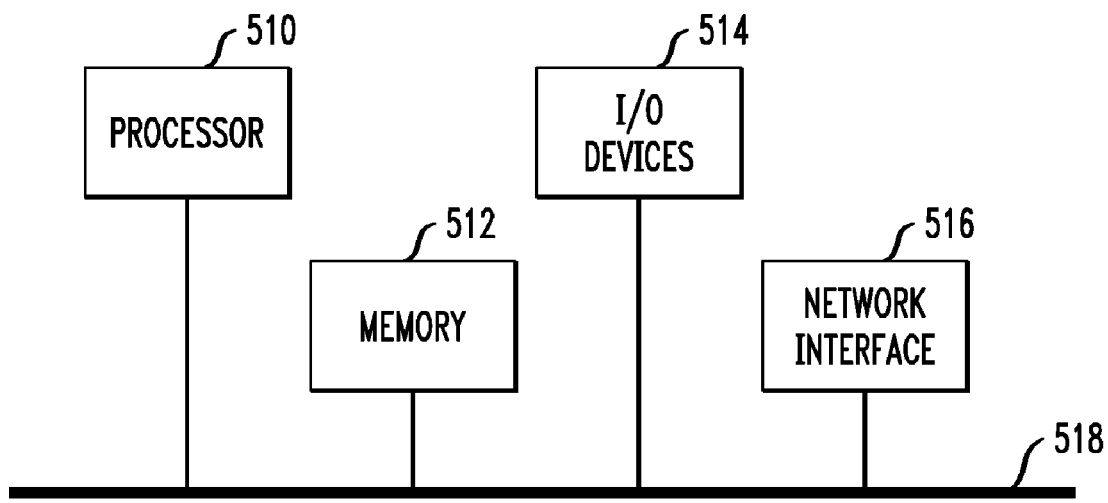
FIG. 5 is a diagram illustrating an illustrative hardware implementation of a computing system in accordance with which one or more components/methodologies of the present invention may be implemented, according to an embodiment of the present invention.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the present invention.

As shown, the techniques for changing a conversation topic between one or more users via a user-interface may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Further, the present invention was described above with reference to diagrams of methods, apparatus (systems), and computer program products according to embodiments of the invention. It will be understood that individual functions/acts in the diagrams, and combinations of functions/acts in the diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagrams.

These computer program instructions may also be stored in a computer-readable medium that may direct a computer or other programmable data processing apparatus to function in a particular manner, such that the instructions stored in the computer-readable medium produce an article of manufacture including instruction means which implement the functions/acts specified in the diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagrams.

The diagrams illustrate the architecture, functionality, and operation of possible implementations of systems, methods, and computer program products according to various embodiments of the present invention. In this regard, individual functions/acts in the diagrams may represent a module, segment, or portion of code, which comprises one or more executable instructions for implementing the specified logical function(s). It should also be noted that, in some alternative implementations, the functions/acts in the diagrams may occur out of the order noted in the diagrams. For example, two steps shown in succession may, in fact, be executed substantially concurrently, or the steps may sometimes be executed in the reverse order, depending upon the functionality involved. It will also be noted that individual functions/acts in the diagrams, and combinations of functions/acts in the diagrams, may be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of changing a conversation topic between a plurality of users via a user-interface, the method comprising a computer performing the steps of:
concurrently displaying a user interface to each of a plurality of users engaging in a conversation over computer-based terminals, wherein the user interface includes input fields to enable any one of the plurality of users to request a change of a current conversation topic and request a new conversation topic and provide the user request to all other users engaging in the conversation;
obtaining from at least a first one of the plurality of users, via the user-interface, a request to change the conversation topic;
notifying the plurality of users, via the user-interface, of the request to change the current conversation topic by presenting an indicator to the plurality of users
obtaining from at least a second one of the plurality of users, via the user-interface, at least one indication of support for the request to change the conversation topic; and
changing the conversation topic between the users in response to the request and the at least one indication of support for the request,
wherein the user-interface is configured to operate in a first mode and a second mode, wherein in the first mode, the users request to change the conversation topic by activating a switch on the user-interface, further wherein in the second mode, the users request to change the conversation topic by inputting one or more new conversation topics,
wherein the user-interface is configured to automatically switch between the first mode and the second mode when more than a threshold percentage of the users request to change the conversation topic.

2. The method of claim 1, wherein the user-interface is integrated into at least one of a virtual meeting room and a chat application.

3. The method of claim 1, wherein the user-interface is configured to display at least one of a discussion start time, a discussion end time, and a remaining discussion time.

4. The method of claim 1, wherein the indicator to the users further comprises at least one of a listing of the users requesting to change the conversation topic, and a number of new conversation topics raised by the users.

5. The method of claim 1, wherein changing the conversation topic comprises selecting a new conversation topic.

6. The method of claim 1, wherein the user-interface is configured to allow the users to input at least one of at least one short description of the one or more new conversation topics, at least one estimated time to discuss the one or more new conversation topics, at least one priority of the one or more new conversation topics, and at least one indication of support for the one or more new conversation topics.

7. The method of claim 6, further comprising the step of modifying the at least one estimated time to discuss the one or more new conversation topics in accordance with a number of users supporting the one or more new conversation topics.

8. The method of claim 6, wherein the indicator to the users comprises a prioritized list comprising at least one of: the one or more new conversation topics, the at least one short description of the one or more new conversation topics, an identification of the users proposing the one or more new conversation topics, an identification of the users supporting the one or more new conversation topics, the at least one estimated time to discuss the one or more new conversation topics, and the at least one priority of the one or more new conversation topics; and
wherein the prioritized list is in accordance with at least one of: a remaining discussion time, the at least one priority of the one or more new conversation topics, the at least one estimated time to discuss the one or more new conversation topics, and the at least one indication of support for the one or more new conversation topics.

9. The method of claim 8, wherein the user-interface is configured to allow at least one of the users and a moderator, to combine the one or more new conversation topics on the prioritized list.

10. The method of claim 8, wherein the user-interface is configured to delete one or more new conversation topics on the prioritized list which have been discussed.

11. The method of claim 8, further comprising the step of reporting at least one of the one or more new conversation topics discussed and the one or more new conversation topics not discussed.

12. An article of manufacture for changing a conversation topic between a plurality of users via a user-interface, the article comprising a computer readable storage medium including one or more programs, which when executed by a computer implement the steps of claim 1.

13. An apparatus for changing a conversation topic between a plurality of users via a user-interface, the apparatus comprising:
- a memory; and
- at least one processor coupled to the memory and operative to:
  - concurrently display a user interface to each of a plurality of users engaging in a conversation over computer-based terminals, wherein the user interface includes input fields to enable any one of the plurality of users to request a change of a current conversation topic and request a new conversation topic and provide the user request to all other users engaging in the conversation;
  - obtain from at least a first one of the plurality of users, via the user-interface, a request to change the conversation topic;
  - notify the plurality of users, via the user-interface, of the request to change the conversation topic by presenting an indicator to the plurality of users;
  - obtain from at least a second one of the plurality of users, via the user-interface, at least one indication of support for the request to change the conversation topic; and
  - change the conversation topic between the users in response to the request and the at least one indication of support for the request,
  - wherein the user-interface is configured to operate in a first mode and a second mode, wherein in the first mode, the users request to change the conversation topic by activating a switch on the user-interface, further wherein in the second mode, the users request to change the conversation topic by inputting one or more new conversation topics,
  - wherein the user-interface is configured to automatically switch between the first mode and the second mode when more than a threshold percentage of the users request to change the conversation topic.

14. A computer program product for changing a conversation topic between a plurality of users via a user-interface, the computer program product comprising:
- a computer readable medium comprising program instructions stored thereon, the program instructions comprising;
- program instructions to concurrently display a user interface to each of a plurality of users engaging in a conversation over computer-based terminals, wherein the user interface includes input fields to enable any one of the plurality of users to request a change of a current conversation topic and request a new conversation topic and provide the user request to all other users engaging in the conversation;
- program instructions to obtain from at least a first one of the plurality of users, via the user-interface, a request to change the conversation topic;
- program instructions to notify the plurality of users, via the user-interface, of the request to change the conversation topic by presenting an indicator to the plurality of users;
- program instructions to obtain from at least a second one of the plurality of users, via the user-interface, at least one indication of support for the request to change the conversation topic;
- program instructions to change the conversation topic between the users in response to the request and the at least one indication of support for the request,
- program instruction to configure the user-interface to operate in a first mode and a second mode, wherein in the first mode, the users request to change the conversation topic by activating a switch on the user-interface, further wherein in the second mode, the users request to change the conversation topic by inputting one or more new conversation topics,
- wherein the user-interface is configured to automatically switch between the first mode and the second mode when more than a threshold percentage of the users request to change the conversation topic.

15. The method of claim 1, wherein the conversation topic is changed when at least a threshold percentage of the plurality of users support the request to change the conversation topic.

16. The method of claim 1, wherein the conversation topic is changed when at least one of the plurality of users affirmatively acts to change the conversation topic in response to the at least one indication of support for the request to change the conversation topic.

17. The method of claim 16, wherein the at least one of the plurality of users affirmatively acting to change the conversation topic comprises the at least one of the plurality of users selecting a new conversation topic.

18. The method of claim 16, wherein the at least one of the plurality of users comprises at least a third one of the plurality of users.

19. The method of claim 18, wherein the at least third one of the plurality of users comprises a moderator.

20. The method of claim 1, wherein the request to change the conversation topic specifies one or more new conversation topics.

21. The method of claim 1, wherein the request to change the conversation topic does not specify a new conversation topic.

22. The method of claim 1, wherein the indication of support for the request to change the conversation topic comprises another request to change the conversation topic obtained from the at least second one of the plurality of users.

23. The method of claim 5, wherein selecting the new conversation topic comprises the plurality of users voting on the new conversation topic.

24. The method of claim 1, wherein the indicator to the plurality of users comprises a visual indication of a percentage of the plurality of users involved in the conversation that are requesting to change the conversation topic.

25. The apparatus of claim 13, wherein the indicator to the plurality of users comprises a visual indication of a percentage of the plurality of users involved in the conversation that are requesting to change the conversation topic.

26. The computer program product of claim 14, wherein the indicator to the plurality of users comprises a visual indication of a percentage of the plurality of users involved in the conversation that are requesting to change the conversation topic.

* * * * *